(No Model.)
A. C. BROWNELL.
ROLLER BEARING FOR WHEELS OF BICYCLES.
No. 582,260. Patented May 11, 1897.
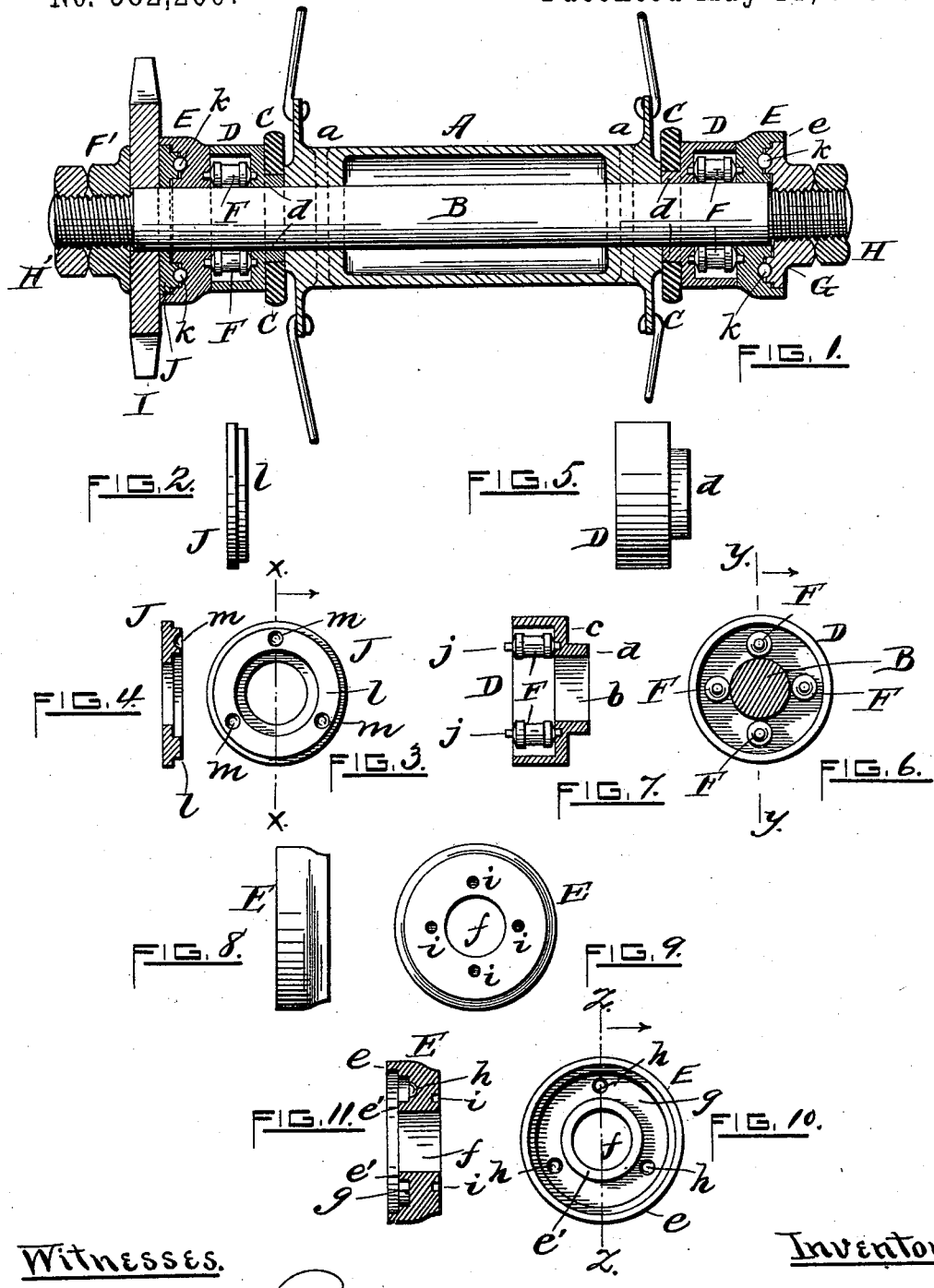
Witnesses.
Charles T. Hannigan
Alexander M. Brown
Inventor.
Alexander C. Brownell
by Warren R. Perce
Atty.

UNITED STATES PATENT OFFICE.

ALEXANDER C. BROWNELL, OF PROVIDENCE, RHODE ISLAND.

ROLLER-BEARING FOR WHEELS OF BICYCLES.

SPECIFICATION forming part of Letters Patent No. 582,260, dated May 11, 1897.

Application filed July 15, 1896. Serial No. 599,274. (No model.)

*To all whom it may concern:*

Be it known that I, ALEXANDER C. BROWNELL, of the city and county of Providence, in the State of Rhode Island, have invented a certain new and useful Improvement in Roller-Bearings for the Wheels of Bicycles; and I declare the following to be a specification thereof, reference being had to the accompanying drawings.

Like letters indicate like parts.

Figure 1 is a longitudinal section of my invention and of the hub of a bicycle-wheel with the axle thereof shown in elevation. Fig. 2 shows in elevation a ball-bearing collar or ring, as seen on its edge. Fig. 3 is a view in rear elevation of said collar or ring. Fig. 4 is a sectional view of the same on line $x\,x$ of Fig. 3. Fig. 5 is a side elevation of one of the boxes. Fig. 6 is a rear elevation of the same. Fig. 7 is a sectional view of the same on line $y\,y$ of Fig. 6. Fig. 8 is a side elevation of the cupped cover of said box. Fig. 9 is a rear elevation thereof. Fig. 10 is a front elevation of the same. Fig. 11 is a sectional view on line $z\,z$ of Fig. 10.

My invention consists in combining a wheel of a bicycle with its axle or spindle secured thereto, so as to be rotatable together, and providing the same with roller-bearings, mounted in suitable boxes and in rolling contact with said axle, for the purpose of reducing friction, and also with balls and ball-bearings, suitably mounted and arranged to resist end-thrust friction of the wheel-hub, as hereinafter particularly described.

In the drawings, A is the hub of a bicycle-wheel, and B the axle or spindle thereof, screw-threaded at its ends. The hub is fastened to the axle by pins $a\,a$ or by a key-spline or any other preferred means, in order that the wheel and axle may be rotated together instead of having the wheel-hub rotate on the axle, as has heretofore been common.

C C are portions of the fork or frame of a bicycle.

D D are tubular boxes fastened to the frame or fork C of the bicycle, which furnishes a fixed support therefor. Each box D has a central bore or aperture $b$, an annular end $c$, and a circular flange $d$. It also has four (or any other desired number of) sockets, as indicated in Fig. 7. It is secured to the frame by screws or by any suitable means.

E E are the annular covers of the boxes D D, which have a general cup shape, Figs. 8 and 11. Each cover E has an outer annular lip or flange $e$, an inner lip or flange $e'$, a central bore or aperture $f$, an annular channel $g$ on one side, with several (preferably three) rounded sockets $h$ therein, placed at equal distances apart, and on the opposite face are sockets $i$, preferably four in number.

F F are the rollers, reduced in diameter by a central groove, thus leaving at each end of the rollers circumferential bearing-surfaces. Each roller also has a centrally-projecting journal $j$ at each end by which it is rotatably mounted in the sockets $i$ of the cover E and in the sockets of the box D.

G is a nut, threaded to engage with the end of the axle B and provided with an annular channel, and H is a check-nut upon the end of the axle B.

The balls $k$ are mounted in the rounded sockets $h$, respectively, of the covers E and project into the annular channel of the nut G.

The sprocket I may be placed as usual, or, if preferred, may be set out on the axle B at a greater distance from the hub, as shown in Fig. 1, and secured thereto. If the sprocket is placed near the wheel, as usual, the roller and ball-bearing devices will be the same on that end of the axle B as at the other and will be located outside of the sprocket, but if the sprocket be placed as in Fig. 1, then instead of the nut G, I use a collar or ring-piece J, having a lip or flange $l$ and rounded sockets $m$, corresponding in size and position to the sockets $h$ of the cover E of the box D. A nut F', engageable with the end of the axle B, abuts the sprocket I, and a check-nut H' keeps the nut F' in place.

The nut G should have its lips or flanges of such diameters, respectively, as to permit it to fit within the lips $e$ and $e'$, but loosely enough to allow it to rotate freely therein.

The boxes D D by their lips or flanges $d$ are secured to the frame C. The pressure of the nut G holds the cover E to the box D. Thus the box D and its cover E do not rotate, but serve to support the several rotatable bearings in position, but the hub A, axle B, and the nuts G H do rotate all together, or, in case of the construction shown at the opposite end of the axle, the nut F' presses the sprocket I and collar J, so that said collar J holds the cover E to the box D on that side. It is thus seen that all the weight of the rider is thrown upon the shouldered portions of the top rollers F and the top of the axle, with which they are in contact, and in this manner the friction is all transferred to bearing-surfaces of the smallest possible extent and so is reduced to a minimum. The rollers F and the axle B should be made sufficiently hard to withstand the friction so produced.

The balls $k$ serve to receive any end-thrust friction between the nut G or F' and covers E.

Any desired number of rollers F may be used, but I prefer four, as shown. Journaled rollers I find are more desirable and efficient than the usual ball-bearing devices heretofore employed in bicycle construction, because they are each separately mounted on a fixed axis and in permanent supports and do not therefore interfere with each other, while, as is well known, a series of balls, loosely mounted in a channel of a conical or other support, has a constant movement on each other, which not only produces friction, but great wear, causing the balls to lose their true spherical shape and to become uneven with a tendency to wedge each other.

As is well known, it is very often necessary in the use of a bicycle to make short turns in its course of travel and when it is so turning a friction is produced in two directions, first, by the pressure exerted on the axle at a right angle thereto, and, secondly, by a lateral or end-thrust pressure at the end of the wheel-hub against the nut or plate. To overcome such friction, I provide my improved bicycle with the rollers F to resist the former kind of friction and with the balls $k$ to resist the latter. Both these antifriction devices coöperate whenever the bicycle is traveling on a sharp curve.

I claim as a novel and useful invention and desire to secure by Letters Patent—

In a bicycle, the combination of a wheel hub and axle rotatable together, with boxes secured to and supported by the bicycle-frame, annular covers having equidistant rounded sockets, cylindrical rollers journaled in said boxes and annular covers, respectively, a nut and a collar secured to and rotatable with said axle and each having an annular channel and balls mounted in said channels and in said sockets, substantially as specified.

ALEXANDER C. BROWNELL.

Witnesses:
ALEXANDER M. BLIVEN,
WARREN R. PERCE.